No. 703,393. Patented July 1, 1902.
E. R. EDSON.
DRYING OIL YIELDABLE OR OIL CONTAINING MATERIAL.
(Application filed Oct. 9, 1901.)
(No Model.)
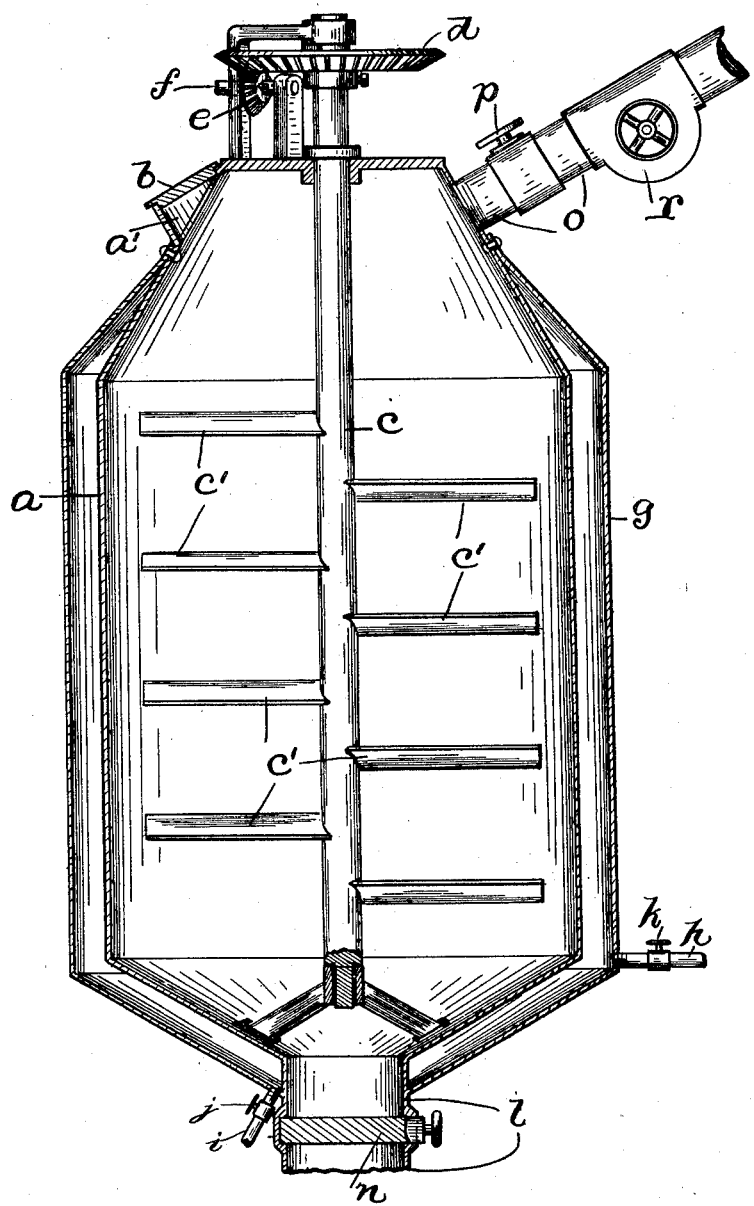
WITNESSES:
Daniel E. Daly.
Victor C. Lynch.
INVENTOR
Eugene R. Edson
BY
his ATTORNEYS
THE NORRIS PETERS CO., PHOTO-LITHO., WASHINGTON, D. C.

UNITED STATES PATENT OFFICE.

EUGENE R. EDSON, OF CLEVELAND, OHIO.

DRYING OIL-YIELDABLE OR OIL-CONTAINING MATERIAL.

SPECIFICATION forming part of Letters Patent No. 703,393, dated July 1, 1902.

Application filed October 9, 1901. Serial No. 78,096. (No specimens.)

*To all whom it may concern:*

Be it known that I, EUGENE R. EDSON, a resident of Cleveland, in the county of Cuyahoga and State of Ohio, have invented certain new and useful Improvements in Drying Oil-Yieldable or Oil-Containing Material; and I hereby declare the following to be a full, clear, and exact description of the invention, such as will enable others skilled in the art to which it pertains to make and use the same.

This invention relates to improvements in drying oil-yieldable or oil-containing material without destroying, injuring, or wasting oil; and the process which constitutes the subject-matter of this application more especially comprises, first, the vaporizing of a large percentage, preferably about fifty per cent., of the oilless moisture contained in or mixed with the oil-yieldable material in any suitable drier and preferably at a temperature of from 150° to 200° Fahrenheit and *in vacuo*, and thereby reducing the mass to the consistency of a sludge, and preferably stirring the mass during the vaporizing or drying period, and, secondly, adding to the reduced mass oil-absorbing material—such, for instance, as sawdust, ground tobacco-stems, and dried marl—preferably in sufficient quantity—as, for instance, from two hundred to three hundred pounds of the oil-absorbing material to one ton of the reduced mass or sludge—to absorb any oil in the mass which is free and not absorbed or carried by the solid particles or portions of the reduced mass, and, thirdly, drying the enlarged mass at a suitable temperature—as, for instance, from 150° to 200° Fahrenheit—until the remainder of the oilless moisture has been vaporized or eliminated.

Oil-yieldable or oil-containing material having more oil than the solid particles of the material can absorb or carry cannot be effectually or sufficiently dried at a temperature as low as 300° Fahrenheit, and a temperature as high as or higher than 300° Fahrenheit must be avoided to prevent discoloration of or injury to the oil.

I would here remark that the process hereinbefore briefly described is both for the purpose of preparing a fertilizer and also invaluable as a step in the rendering of the oil.

The accompanying drawing is a side elevation, in central vertical section, of apparatus suitable for use in carrying out the process which constitutes the subject-matter of this application.

Referring to the drawing, $a$ designates an upright receptacle into which the oil-yieldable material, fish-waste, or other oil-containing matter which is to be dried is introduced for treatment. The receptacle $a$ is preferably closed, being provided at its upper end and at one side with a manhole or charging-aperture $a'$, normally closed by a suitably-applied cover $b$.

The receptacle $a$ is centrally provided with a vertically-arranged shaft $c$, which is supported in any approved manner and extends from within the lower portion of the receptacle upwardly and a suitable distance above the receptacle. A bevel-gear $d$ is operatively mounted upon the shaft $c$ above the receptacle $a$ and meshes with a bevel-pinion $e$, with which a suitably-supported and suitably-driven driving-shaft $f$ is operatively provided. The shaft $c$ has any suitable number of laterally-projecting stirring-arms $c'$. A closed heating-jacket $g$ surrounds the receptacle $a$. A valved pipe $h$ for supplying the heating agent—steam or whatever it may be—to the chamber of the jacket is arranged to discharge into the said chamber and has a normally-closed valve $k$. A drain-pipe $i$ extends from the lower end of the heating-jacket $g$ and has a normally-closed valve $j$. The pipe $i$ is in open relation with the chamber of the jacket, and obviously liquid resulting from condensation of steam or otherwise forming and accumulating in the said chamber can be readily drained from the jacket through the pipe $i$ upon opening the valve $j$.

The receptacle $a$ is provided at its lower end and centrally with a downwardly-discharging outlet-forming pipe or flue $l$, which is provided in any approved manner with a normally-closed slide-valve $n$.

The receptacle $a$ is provided at its upper end and at one side with a vapor-conducting pipe or flue $o$, and a suction-creating device $r$—such, for instance, as a rotary pump or fan—is arranged in the line of the said flue or pipe. The flue or pipe $o$ has a normally-closed valve $p$ between the receiving end or inlet of the suction-creating device and the inner or receiving end of the pipe or flue.

In operating the apparatus the cover b is opened and the oil-yieldable material which is to be dried is introduced into the receptacle at the aperture a', and the said cover is again closed, when the valve k of the pipe h is opened to permit the supply of the heating-agent to the chamber of the heating-jacket and to result in the heating of the receptacle a and its contents. The valve p of the vapor-conducting pipe or flue o is opened to permit the vaporized moisture and gases to escape from the material being dried, and the shaft c, and consequently its stirring-arms c', are operated during the drying period to stir or disintegrate the material and to facilitate the elimination of the oilless moisture from the material; but the mass undergoing treatment must not be subjected to a temperature as high as 300° Fahrenheit, because a temperature as high as 300° Fahrenheit would result in the discoloration of or injury to the oil, which is too valuable to be injured or wasted. The suction-creating device r may be operated during the drying period not only to facilitate the elimination of the moisture and gases from within the receptacle a, but to prevent overheating of the mass within the said receptacle.

The material which is to be dried is treated, as hereinbefore described, at a drying temperature lower than 300° Fahrenheit until a large percentage of oilless moisture in the mass—say about fifty per cent.—has been vaporized or until the mass has been reduced to the consistency of a sludge. When the mass has been thus reduced, a suitable quantity of oil-absorbing material—such, for instance, as sawdust, ground tobacco-stems, and dried marl—is introduced into the receptacle a at the aperture a' upon opening the cover b, whereupon the said aperture is again closed. Enough oil-absorbing material is added to the reduced mass within the receptacle a to absorb any oil which is free from or not already absorbed by the solid particles or portion of the reduced mass and which the reduced mass could not absorb and carry during the remainder of the drying period. Good results have been obtained by adding from two hundred to three hundred pounds of the oil-absorbing material to one ton of the reduced mass or sludge. When the oil-absorbing material has been added, as hereinbefore described, the stirring-shaft is operated to mix the oil-absorbing material with the aforesaid reduced mass, and the drying of the enlarged mass takes place, and the remaining oilless moisture can be readily eliminated at a temperature low enough—that is, lower than 300° Fahrenheit—to avoid discoloration of or injury to the oil, and the stirring-shaft and the suction-creating device are operated as may be required to facilitate the drying of the enlarged mass.

What I claim is—

1. The process of drying an oil-yieldable or oil-containing mass of material consisting in partially drying the material, then adding an oil-absorbing material to the reduced mass, and then drying the enlarged mass, substantially as and for the purpose set forth.

2. An improved process of drying an oil-yieldable or oil-containing mass of material, consisting in drying the material at a temperature low enough to avoid injury to or deterioration of the oil until a large portion of the oilless moisture has been eliminated from the mass, then adding oil-absorbing material to and mixing the same with the reduced mass, and then drying the enlarged mass at a temperature not detrimental to the oil.

3. An improvement in drying a mass of material which contains more oil than the solid particles or portion of the mass can absorb or carry, consisting in adding, to the mass, oil-absorbing material capable of absorbing and carrying free oil not already absorbed, substantially as and for the purpose set forth.

4. An improved process of drying a mass of material which contains more oil than the solid particles or portion of the mass can absorb or carry, consisting in vaporizing a portion of the oilless moisture contained in the mass, then adding oil-absorbing material and mixing the same with the reduced mass, and then drying the enlarged mass.

5. The improved process of drying an oil-yieldable or oil-containing mass of material herein described, consisting in partially drying the material at a temperature below 300° Fahrenheit, and *in vacuo*, until enough oilless moisture has been eliminated to reduce the mass to the consistency of a sludge, then adding oil-absorbing material to and mixing the same with the reduced mass, and then drying the enlarged mass at a temperature below 300° Fahrenheit, and *in vacuo*, substantially as and for the purpose set forth.

Signed by me at Cleveland, Ohio, this 12th day of September, 1901.

EUGENE R. EDSON.

Witnesses:
C. H. DORER,
TELSA SCHWARTZ.